July 26, 1955 H. V. PITTMAN 2,713,835
SOD-PLANTING MACHINE
Filed Feb. 9, 1951 6 Sheets-Sheet 1
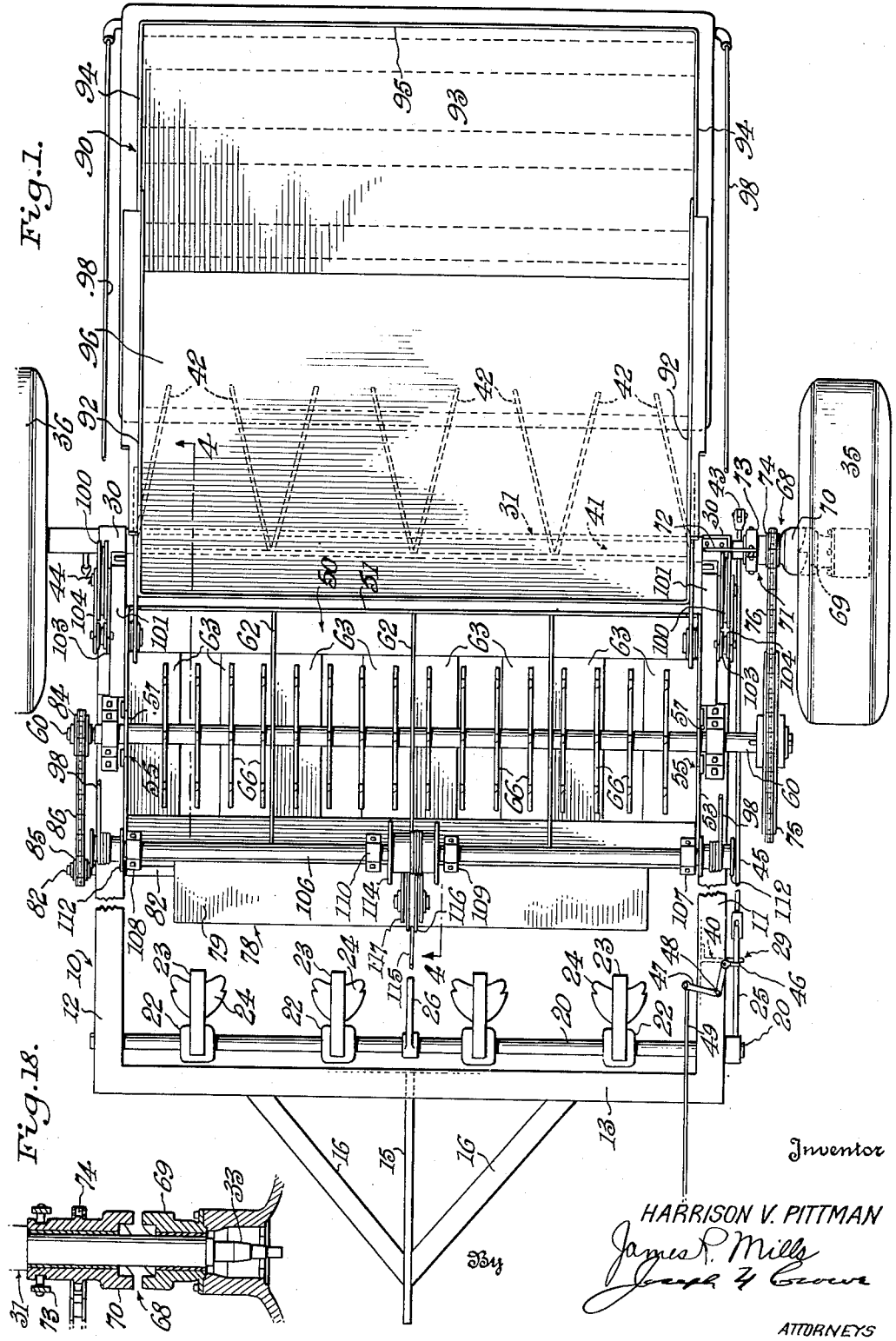
Inventor
HARRISON V. PITTMAN
ATTORNEYS July 26, 1955  H. V. PITTMAN  2,713,835
SOD-PLANTING MACHINE
Filed Feb. 9, 1951  6 Sheets-Sheet 2
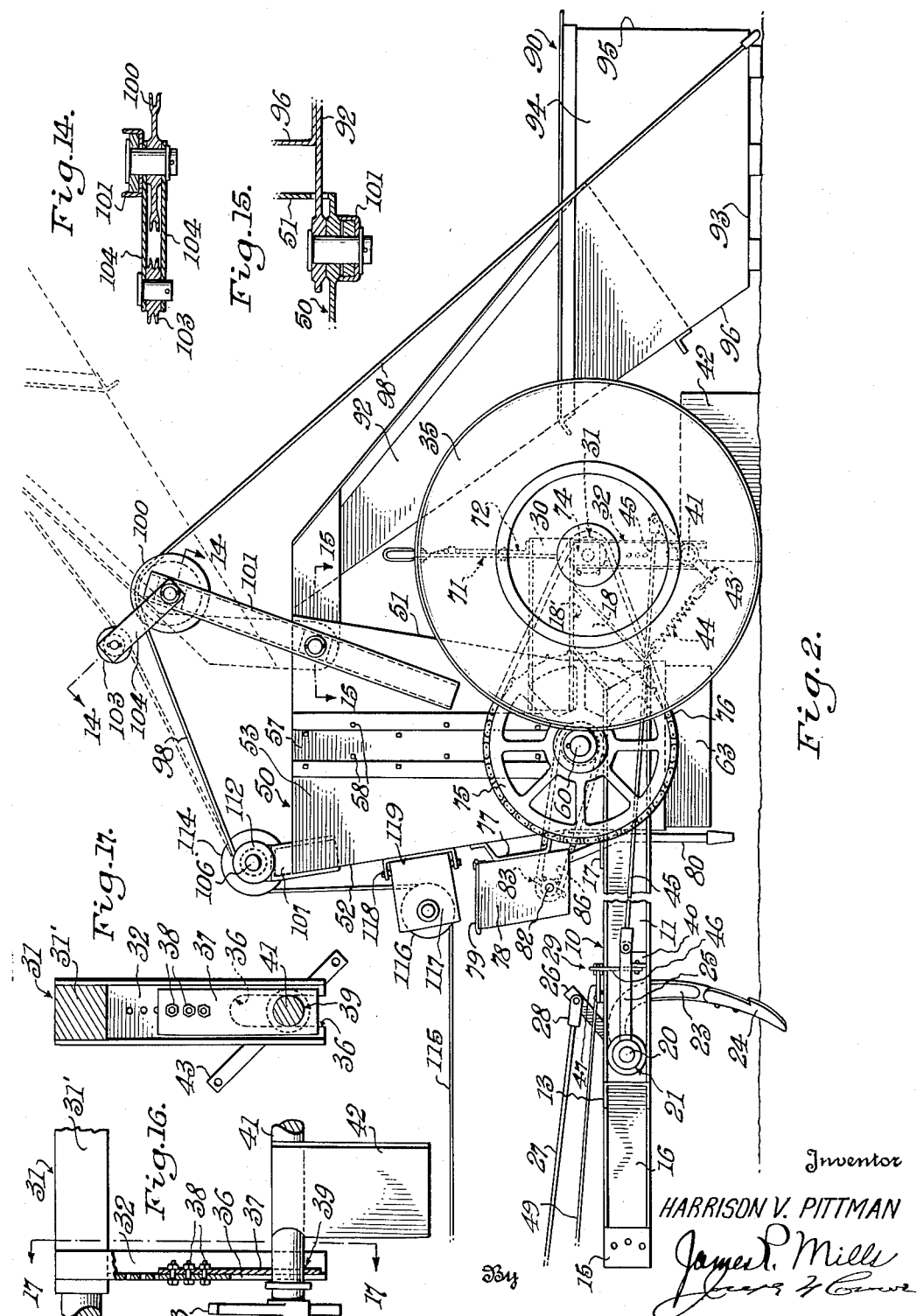
Inventor
HARRISON V. PITTMAN
ATTORNEYS July 26, 1955   H. V. PITTMAN   2,713,835
SOD-PLANTING MACHINE
Filed Feb. 9, 1951   6 Sheets-Sheet 3
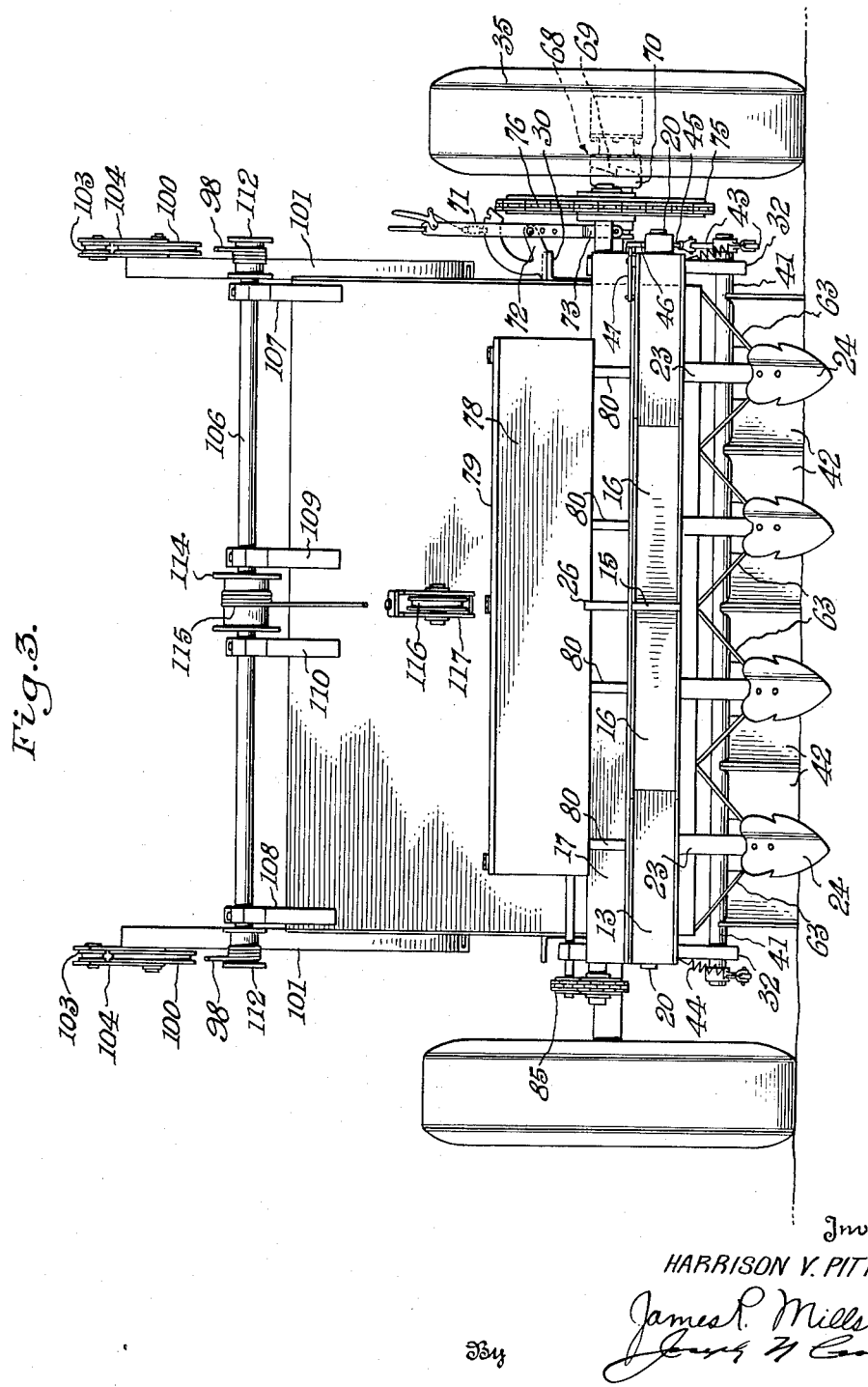
Inventor
HARRISON V. PITTMAN
ATTORNEYS

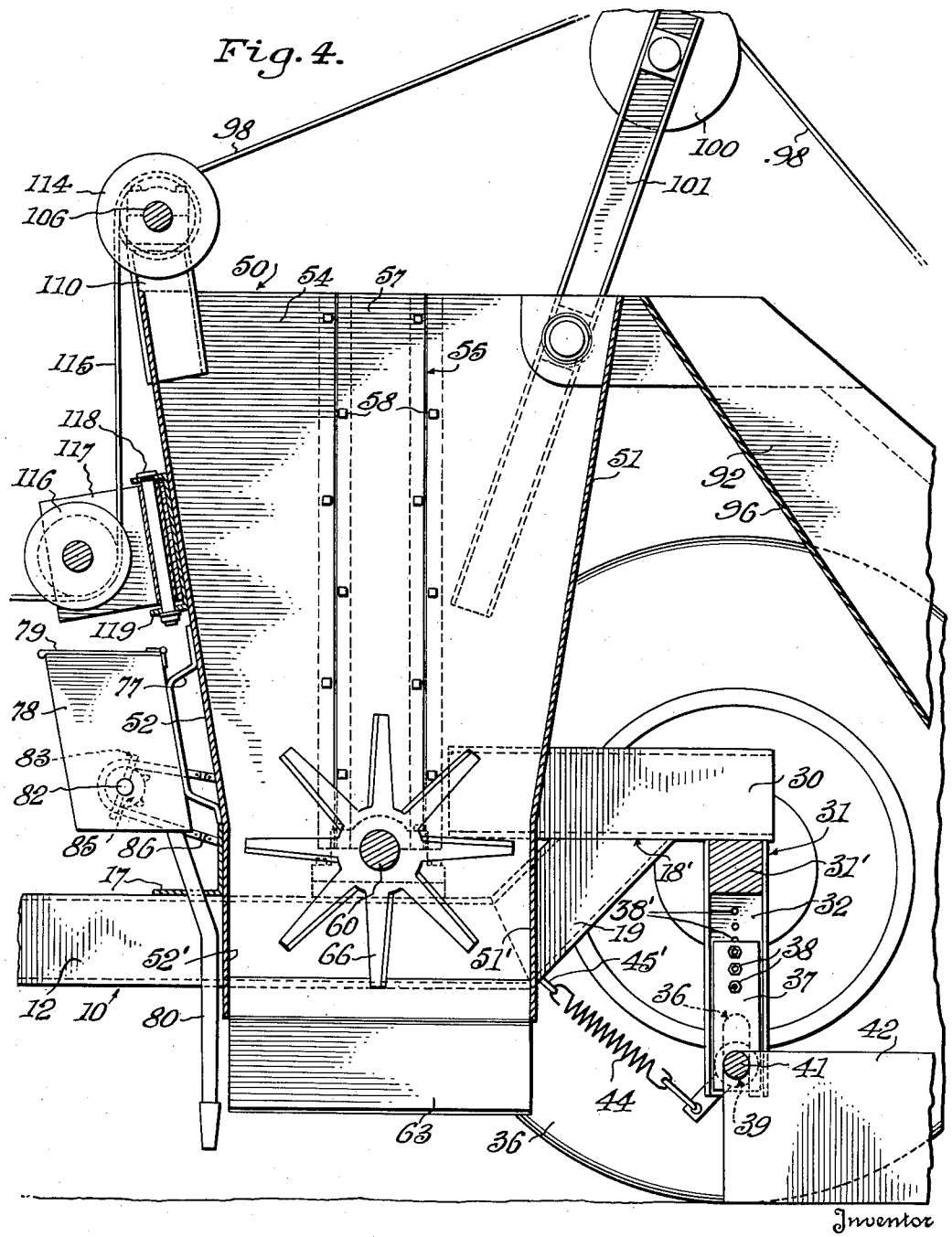

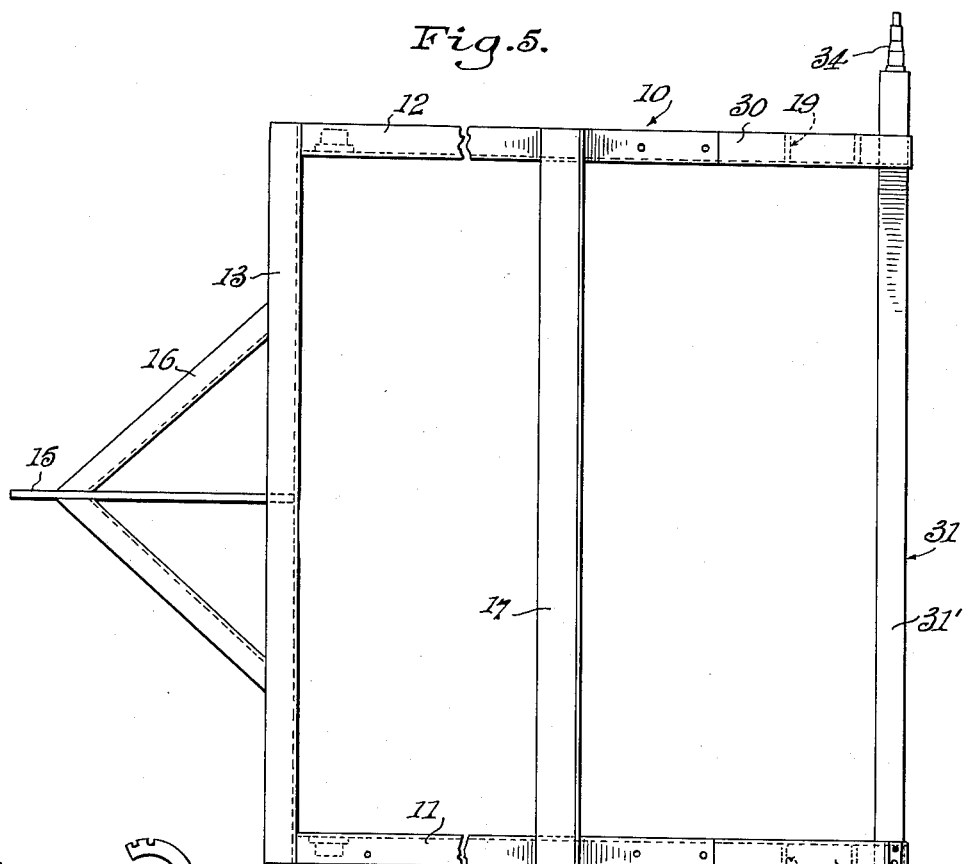
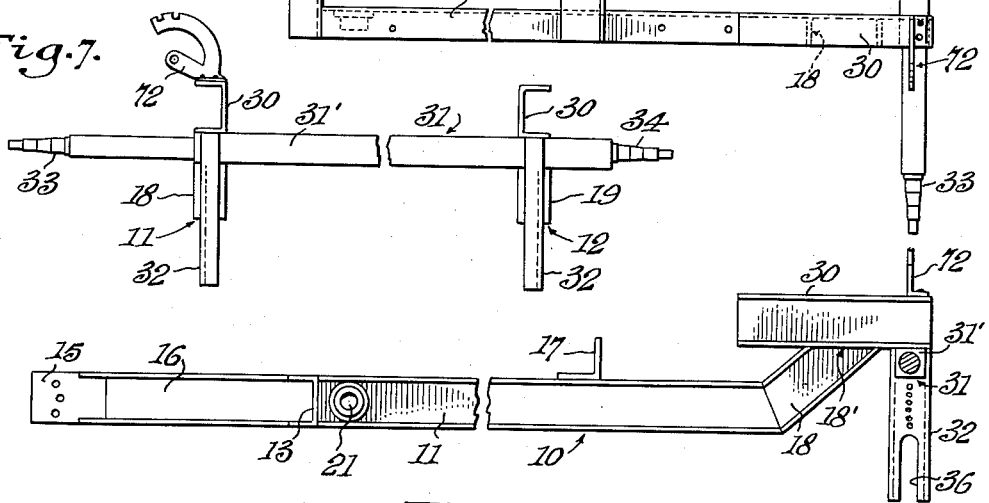

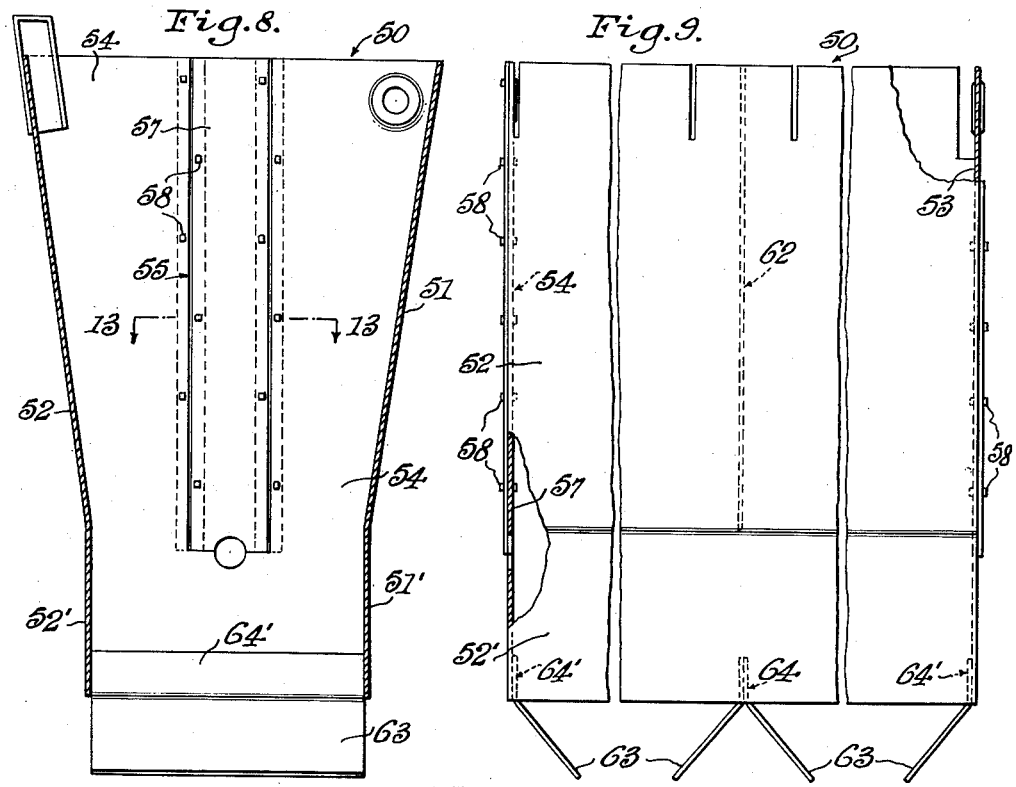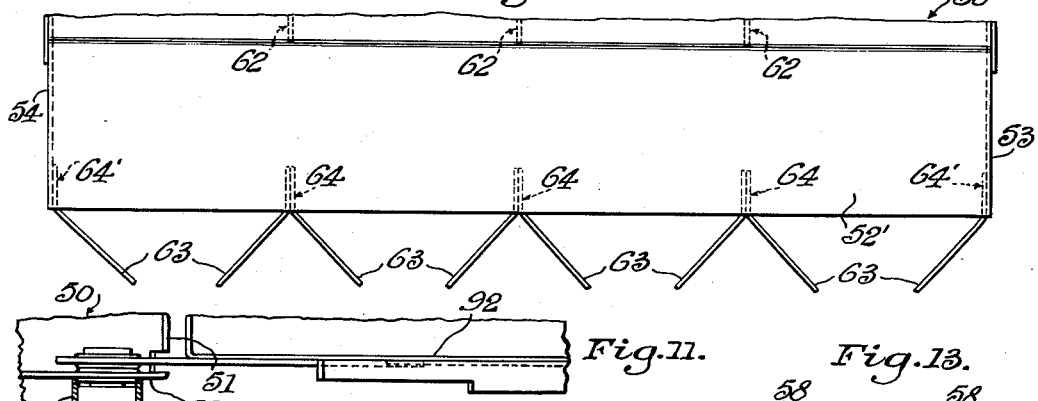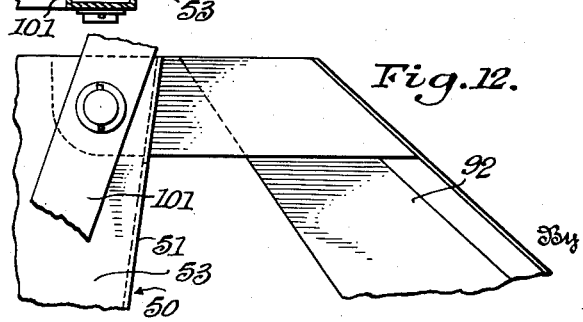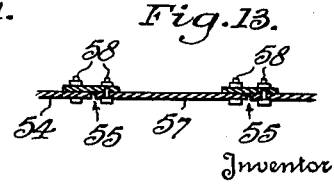

United States Patent Office 2,713,835
Patented July 26, 1955

2,713,835

SOD-PLANTING MACHINE

Harrison V. Pittman, Little Rock, Ark.

Application February 9, 1951, Serial No. 210,272

3 Claims. (Cl. 111—61)

(Granted under Title 35, U. S. Code (1952), sec. 266)

The invention described herein may be manufactured and used by or for the Government for governmental purposes, without payment to me of any royalty thereon.

This invention relates generally to agricultural operations and, more particularly, to improvements in a machine for planting sod.

Accordingly, it is an object of the invention to provide a sod-planting machine adapted to be towed by a tractor or the like, and including means for carrying, comminuting, and distributing live sod to furrows cut by plows associated with the device, and having means for covering the furrows after the sod has been planted therein.

A further object of the invention is the provision of a tractor-drawn device for opening spaced furrows, planting sod therein, and covering the sod in the furrows, which is of relatively simple construction, durable and easy to operate from a central point.

A still further object of the invention is the provision of a sod-planting machine adapted for large-scale operation over various kinds of terrain.

These and other objects of the invention will become apparent from the following description taken in conjunction with the accompanying drawings in which:

Fig. 1 is a plan view of a planting machine embodying the improvements of the present invention as applied to a large capacity sod-planting machine, the view indicating the interrelationship between the principal structural elements of the machine, portions of the frame of the machine and certain of the operating parts being indicated as being broken out, and a mounting traction wheel for the machine being shown fragmentarily;

Fig. 2 is a side elevation of the machine illustrated in Fig. 1, the view also indicating that portions of the frame and associated parts have been broken out for accommodating the view to the size of the sheet for the drawing;

Fig. 3 is a front elevation of the machine illustrated in Figs. 1 and 2, certain elements being omitted for clarity;

Fig. 4 is a fragmentary vertical sectional view taken on the line 4—4 of Fig. 1, looking in the direction of the arrows;

Fig. 5 is a plan view of the machine frame, the view indicating portions thereof being broken away;

Fig. 6 is a side elevation of the frame shown in Fig. 5, the view being taken looking from the bottom of Fig. 5;

Fig. 7 is a rear elevation of the machine frame shown in Fig. 5;

Fig. 8 is a sectional elevation of the hopper, similar to the showing of Fig. 4, but with certain elements of Fig. 4 removed;

Fig. 9 is an elevational view, partly in section, of the hopper shown in Fig. 8, the view being taken at right angles to Fig. 8, looking from the left, the view indicating parts being broken out;

Fig. 10 is an elevational view of the complete bottom portion of the hopper shown in Figs. 8 and 9, the top portions of the hopper being broken away;

Fig. 11 is a fragmentary plan view, partly in section, of the pivotal mounting for a skip employed for charging the hopper of the machine;

Fig. 12 is a fragmentary side elevation of the elements shown in Fig. 11;

Fig. 13 is a horizontal sectional view, taken on the line 13—13 of Fig. 8, looking in the direction of the arrows;

Fig. 14 is a sectional plan view of two top sheave elements shown in Fig. 2, showing details of the mounting thereof, the view being taken on the line 14—14 of Fig. 2, looking in the direction of the arrows, the cables being omitted;

Fig. 15 is a further sectional plan view through additional sheave and frame elements, the view being taken on the line 15—15 of Fig. 2, operating cables for the sheaves indicated by dotted lines in Fig. 2 being omitted, the view being taken in the direction of the arrows of line 15—15 of Fig. 2;

Fig. 16 is an end elevation, partly in section, of the cover plate shaft supporting bracket;

Fig. 17 is a sectional elevation taken on the line 17—17 of Fig. 16, looking in the direction of the arrows; and Fig. 18 is a fragmentary sectional elevation of a clutch member employed in the present construction, parts being omitted for clarity.

The present machine defined and claimed in the instant application embodies certain structural improvements in the present applicant's sod-planting machine described and claimed in his issued Letters Patent of the United States No. 2,661,708, dated December 8, 1953, on application Serial No. 676,130, filed June 12, 1946.

Referring to the drawings, the embodiment shown includes a substantially rectangular frame 10 having left and right side channel members 11 and 12, and a front channel 13. Attached to the central portion of the front member 13 is a tow bar 15 having angularly disposed supporting angle iron struts 16 connecting it to the member 13. A transverse angle iron member 17 parallel to member 13 connects the side members 11 and 12 at approximately their mid-portions.

Disposed behind the front member 13 and substantially parallel thereto is a plow supporting shaft 20 which is rotatably mounted in apertures 21 of the side frame members 11 and 12. Rigidly connected to shaft 20 are a plurality of hubs 22, each carrying an arm 23 supporting a plow blade 24. At one end of the shaft 20 is a crank arm 25 and centrally of the shaft is a lever arm 26. A cable or rod 27 is connected with the lever 26 by means of a clevis or other linkage 28. For certain types of plow blades and under particular conditions auxiliary means to prevent lifting of the plow blades 24 from the ground may be desired. To accomplish this a latch mechanism 29 is provided adjacent the arm 25. The mechanism comprises a bracket 40 secured to the frame member 11 and pivotally carrying a pawl 46 for engaging the arm 25 to prevent its being raised. The other end of the pawl 46 is pivotally connected to an arm of a bell crank lever 47, the lever being pivoted on the frame at the apex 48 of its arms. A rod or cable 49 extends from the other arm of the lever 47 to a position for actuation by an operator. In use the arm 25 rests on the bracket 40 and is held thereagainst by the pawl 46; the pawl may be urged to holding position by suitable means (not shown), if desired, and released by actuation of rod or cable 49.

The rear portion of the frame has angularly disposed offset portions 18 and 19 which extend upwardly when the frame is in normal horizontal position, the ends 18' being beveled parallel to the side members 11 and 12. Supported in the plane of the side members and on the beveled ends 18' are channel members 30. The members 30 extend beyond the ends 18' and are substantially coplanar therewith. To the underside of the overhanging rear portion of channel members 30 a main shaft or axle 31 is attached having a rectangular central portion 31' and conventional left and right stub shafts 33 and 34, having wheels 35 and 36 journalled thereon.

Extending at substantially right angles thereto, and downwardly when the frame is in normal position, are channel brackets 32, slotted at their upper portion to receive the shaft 31 adjacent to the members 30. Brackets 32 each have an elongated slot 36 at their lower portion which cooperates with a plate 37 attached thereto by suitable fastening means 38 extending through spaced apertures 38' in the members 32 and 37. At the lower portion of the plate 37, an aperture 39 is provided for receiving the shoe or cover plate shaft 41. Rigidly attached to the shaft 41 are a plurality of pairs of angularly disposed spaced shoes or cover plates 42, each member of a pair being inclined toward each other at their trailing edges in order to scrape the earth on the side of the furrows cut by the plow blades into the corresponding furrows. The spaced apertures 38' in brackets 32 provide for vertical adjustment of shaft 41 and cover plates 42. The cover plates are spaced in accordance with the spacing of the plow blades, one pair for each blade, in order to provide for the replacement of the earth in each furrow. In the embodiment shown four each of the blades and cover plates are illustrated although it is understood that a lesser or greater number may be employed if preferred.

Transversely of the end of the shaft 41 adjacent to the wheel 35 a crank arm 43 is attached. A tension spring 44 connected to the lower end of the crank arm and to the rear portion of the frame by hook 45' tends to rotate the crank arm 43 in a clockwise direction as viewed in Fig. 2 in order to resiliently maintain cover plates 42 on shaft 41 against the ground. The other end of the crank arm 43 is connected to a rod or cable 45 which extends to the crank arm 25 of the plow blade shaft.

From the foregoing description it is apparent that the plow blades and cover plates will normally occupy the ground engaging position shown in Fig. 2, and that an operator by applying sufficient tension on the cable or rod 27 may rotate the shaft 20 by means of the lever 26 in order to raise the plow blades from the ground, the crank arm 25 simultaneously acting through the rod or cable 45 to rotate the shaft 41 thus raising the cover plates 42.

For carrying the load of sod for distribution to the furrows, a hopper 50 is supported between the side members 11 and 12 of the frame forwardly of the wheels and with its lower portion just off the ground. The hopper includes rear and front walls 51 and 52 which diverge upwardly for approximately ⅔ of their upper portions and are substantially parallel at their lower portions 51' and 52'. Side walls 53 and 54 of the hopper each have an elongated slot 55 substantially centrally thereof and extending from the top to adjacent the lower portion thereof, a plate 57 being secured by suitable fastening means 58 for covering the slot after installation of a cutter blade shaft 60. An arcuate slot is formed on the lower edge of each plate 57 and the registering edge of the sides 53 and 54 of the hopper for receiving the shaft 60.

Disposed within the hopper and longitudinally thereof and extending from the top to adjacent to the bottom are a plurality of dividers 62 subdividing the upper portion of the hopper. For guiding the discharge of the material from the hopper in spaced rows a plurality of pairs of inclined guides 63 are provided, one pair for each subdivision of the hopper, each pair being adapted to guide the sod into a furrow cut out by the plow. The inclined guides 63 have offset portions 64 secured between the members 51' and 52' of the hopper and substantially in line with the divider plates 62 therein, except for the offset portions 64', on the extreme end guides which are directly adjacent to the side walls of the hopper.

Rigidly secured to the shaft 60 are a plurality of spaced cutter blades 66 which during rotation of the shaft are adapted to comminute the sod within the hopper and assist in its being mixed and evenly distributed to the inclined guides for distribution to the respective furrows.

For taking power off the wheel 35 a clutch 68 is provided having a driving member 69 adjacent to the wheel and a driven member 70 adapted to be engaged therewith. A lever 71 is attached to the side member of the frame 11 by a bracket 72 and has a fork 73 engaged with the driven member 70 for moving it into and out of engagement with the driving member 69. Member 70 has a sprocket 74 secured thereto and is adapted to transmit power to a sprocket 75 secured to the end of the shaft 60 adjacent to the wheel 35 by means of a chain drive or the like 76.

Attached to the lower forward portion of the hopper by a channel member 77 is a receptacle 78 for fertilizer. The receptacle has a lid 79 and a plurality of spaced discharge conduits 80, the latter of which extend from the bottom thereof and are spaced to convey fertilizer into or adjacent the furrows cut by the respective plow blades, a conduit 80 being provided for each furrow.

Rotatably supported in the lower portion of the fertilizer receptacle 78 is a shaft 82 carrying a plurality of agitator members 83 for facilitating the distribution of the fertilizer to the conduits and its discharge therethrough. Sprocket members 84 and 85 are provided on the ends of the shafts 60 and 82, respectively, for transmitting power from the former to the latter shaft by a chain drive or the like 86.

It is apparent that an operator, if he so desires, may actuate the lever 71 to engage the clutch 68, thus driving the shaft 60 for the cutter blades and that the power from the latter shaft is utilized to drive the agitator shaft 82 of the fertilizer receptacle.

In order to place sod into the hopper, a skip or bucket 90 is pivotally connected by arms 92 to the upper side portions of the hopper. The skip 90 has a bottom 93, side walls 94, a rear wall 95, and an inclined front wall 96, the skip resembling an enlarged coal scuttle. The arm 92 is an extension of the mouth or front wall 96 of the skip and includes a web with side walls for conveying material from the skip over the arm into the hopper when the skip is raised to the proper position.

In order to lift the skip from the position shown in solid lines, Fig. 2, to that shown in phantom, cables 98 are engaged with each side of the skip. Each cable 98 passes over a main sheave 100 attached to the corresponding side of the hopper by an arm 101, the sheaves being supported substantially above the mouth of the hopper and slightly to the rear thereof. Each of the arms 101 has a pair of spaced arms 104 extending from the shaft of the sheave 100 and carries a secondary sheave 103 between the arms 104 and spaced from the main sheave 100. Each cable 98, therefore, extends over a sheave 100, between arms 104, in normal position. When each cable 98 is retracted to raise the skip to the position shown in phantom, the cable may move from engagement with the sheave 100 to engage sheave 103, being retained between the spaced arms 104 at all times.

On the upper forward portion of the hopper a spool-carrying shaft 106 is carried by supports 107 and 108 at the sides and spaced supports 109 and 110 adjacent to the center thereof. At the ends of the shaft 106, spools 112 are provided about which the ends of the cables 98 are wound.

On the central portion of the shaft a spool 114 is secured between the supports 109 and 110 and has a cable 115 wound thereabout. Swingably supported at approximately the central portion of the front wall of the hopper is a sheave 116 about which the cable 115 from the sheave 114 is passed. The sheave 116 is carried by a frame 117 secured at its rear by bolt 118 to a channel member 119 attached by conventional means such as welding or the like to the exterior of the front wall of the hopper. The cable 115 extends from the spool 114 forwardly of the device to a winch or the like, not shown, under the control of an operator.

In the use of the device the tow bar 15 is attached to a suitable towing means, esuch as a tractor, and the skip 90 is filled to the desired level with sod or other material to be placed in the furrows. Fertilizer may be placed in the receptacle 78 for distribution in or adjacent to the furrows. Assuming that the device has been moved to the location in which the sod planting is to take place, the cable 115 is wound in sufficiently to rotate the shaft 106 to wind in the cable 98 raising the skip into position for discharging all or a portion of its contents into the hopper 50. The skip may be maintained in the raised position in order to gradually discharge the material therefrom into the hopper as the device is moved, or after such discharge it may be lowered to a position just off the surface of the ground.

It is understood that during the maneuvering and transporting of the device to the location for sodding, the operator may apply sufficient force to the cable or rod 27 to turn the lever 26, thus rotating the shaft 20 and raising the plow blades 24 out of engagement with the ground. At the same time shaft 20 rotates the crank arm 25, thus applying sufficient force on the crank arm 43 through the rod or cable 45 to rotate arm 43 against the tension of the spring member 44 and to overcome the weight of the cover plates 42 in order to raise these from engagement with the ground. Thus the device may be rolled with only the wheels 35 and 36 in engagement with the ground when desired by the operator.

When the operator is ready to begin planting sod, the rod or cable 27 is released to permit the plow blades and cover plates to engage the ground, it being understood that the spring 44 affords sufficient torque on the crank arm 43 to maintain the cover plates in engagement with the ground with sufficient force for them to perform their function. The latch mechanism 29 may be engaged after the plow blades are lowered in order to maintain them in this position.

It is apparent, therefore, that the invention includes a main wheeled frame adapted to be towed by a tractor or the like and including spaced plow blades for cutting furrows in the earth, a receptacle having means for discharging fertilizer into or adjacent to the furrows, a hopper having means for comminuting sod and discharging it into the spaced furrows, and spaced cover plates adapted to be dragged over the ground behind the hopper for covering the furrows after the sod has been discharged thereinto. A skip is provided on the hopper for receiving sod to be used in the hopper. Means are provided for simultaneously raising the plow blades and the cover plates from engagement with the earth, and other means are provided for the raising and lowering of the skip as desired, both of said means being operable simultaneously by an operator from a central point.

It will be apparent that obvious changes may be made from the foregoing structure without departing from the spirit and scope of the invention and the invention is not therefore limited to the specific embodiment shown but only as described in the appended claims.

Having thus described my invention, what I claim as new and wish to secure by Letters Patent is:

1. A sod-planting machine comprising, in combination, a frame supported for movement over the ground in a direction of travel, a transversely-extending hopper divided into transversely-spaced substantially equal sod-receiving compartments for discharging sod in parallel rows, sod-comminuting means in the compartments, a first rock-shaft journaled in the frame transversely thereof forwardly of the hopper, plows mounted on the first rock-shaft, there being a plow forward of and in fore-and-aft alignment with each of the compartments for forming a furrow into which comminuted sod from the compartment is discharged, a second rock-shaft journaled in the frame parallel to the first rock-shaft rearwardly of the hopper, furrow-closing means including transversely-spaced pairs of vertical plates mounted on the second rock-shaft, there being a pair of such plates disposed generally on each fore-and-aft line midway of the plows and compartments with the plates of each pair joined along their forward edges and diverging rearwardly into a V-shaped configuration, and means interconnecting the rock-shafts for simultaneously rocking the same, the last-named means including an arm fixed to each of the rock-shafts with link means interconnecting the arms, and means for rocking one of the rock-shafts.

2. A sod-planting machine as defined in claim 1, further characterized in that the second rock-shaft is vertically adjustable.

3. A sod-planting machine as defined in claim 1, further including latch means on the frame engaging the arm on the first rock-shaft for holding the plows down in furrow-forming position.

References Cited in the file of this patent

UNITED STATES PATENTS

| 23,896 | Brinkerhoff | May 10, 1859 |
| 269,898 | Tilley | Jan. 2, 1883 |
| 295,846 | Wick | Mar. 25, 1884 |
| 478,137 | Skorpil | July 5, 1892 |
| 581,966 | Todd | May 4, 1897 |
| 682,900 | Bachman et al. | Sept. 17, 1901 |
| 689,634 | Carney | Dec. 24, 1901 |
| 732,731 | Gerling | July 7, 1903 |
| 870,693 | Shirley | Nov. 12, 1907 |
| 871,328 | Downs | Nov. 19, 1907 |
| 889,706 | Mertens | June 2, 1908 |
| 1,392,054 | Herron | Sept. 27, 1921 |
| 1,450,070 | Fuller | Mar. 27, 1923 |
| 1,517,715 | De Geus | Dec. 2, 1924 |
| 1,959,561 | Artrip | May 22, 1934 |
| 2,271,444 | Schutz et al. | Jan. 27, 1942 |
| 2,272,648 | Smith | Feb. 10, 1942 |
| 2,581,263 | Lehman | Jan. 1, 1952 |
| 2,661,708 | Pittman | Dec. 8, 1953 |

FOREIGN PATENTS

| 4,486 | Great Britain | 1902 |
| 75,756 | Germany | June 22, 1894 |
| 563,607 | Great Britain | Aug. 22, 1944 |

OTHER REFERENCES

Browning et al.: Abstract of application Serial Number 141,804, published July 17, 1951, 648 O. G. 950.

Farmers' Bulletin No. 1813 (U. S. Dept. of Agr.) (pages 30 and 31), September 1939.